United States Patent
Iino et al.

(10) Patent No.: US 12,340,574 B2
(45) Date of Patent: Jun. 24, 2025

(54) LEARNING UTILIZATION SYSTEM, UTILIZING DEVICE, LEARNING DEVICE, NON-TRANSITORY COMPUTER-READABLE MEDIUM, AND LEARNING UTILIZATION METHOD

(71) Applicant: Mitsubishi Electric Corporation, Tokyo (JP)

(72) Inventors: Susumu Iino, Tokyo (JP); Misato Naito, Tokyo (JP); Kiyoyasu Maruyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 313 days.

(21) Appl. No.: 18/009,333

(22) PCT Filed: Jul. 28, 2020

(86) PCT No.: PCT/JP2020/028859
§ 371 (c)(1),
(2) Date: Dec. 9, 2022

(87) PCT Pub. No.: WO2022/024211
PCT Pub. Date: Feb. 3, 2022

(65) Prior Publication Data
US 2023/0260270 A1    Aug. 17, 2023

(51) Int. Cl.
G06V 10/82    (2022.01)
G06N 3/045    (2023.01)

(52) U.S. Cl.
CPC ............. *G06V 10/82* (2022.01); *G06N 3/045* (2023.01)

(58) Field of Classification Search
CPC .... G06V 10/82; G06V 10/764; G06V 10/454; G06V 10/774; G06V 10/751;
(Continued)

(56) References Cited
U.S. PATENT DOCUMENTS 10,452,979 B2 * 10/2019 Park .................. G06N 3/045
11,416,715 B2 * 8/2022 Lee ................... G06F 18/2193
(Continued)

FOREIGN PATENT DOCUMENTS

JP    2017-174298 A    9/2017
JP    2017-182320 A    10/2017
(Continued)

OTHER PUBLICATIONS

International Search Report and Written Opinion mailed on Oct. 6, 2020, received for PCT Application PCT/JP2020/028859, filed on Jul. 28, 2020, 9 pages including English Translation.
(Continued)

*Primary Examiner* — Michael S Osinski
(74) *Attorney, Agent, or Firm* — XSENSUS LLP

(57) ABSTRACT

A utilizing device includes a utilizing-side inference unit that uses a utilizing-side inference network to perform inference from target data, and a utilizing-side transmitting unit that transmits the target data to a learning device when the degree of certainty of the inference result inferred by the utilizing-side inference network is lower than a predetermined criterion. The learning device includes a learning-side inference unit that uses a learning network functioning as a teacher model of a utilizing-side inference network to perform inference from the received target data to generate learning data, a learning unit that generates updated weighting coefficient information indicating weighting coefficients updated by relearning the learning-side inference network which has the same network structure as the utilizing-side inference network by using the learning data, and a learning-side transmitting unit that transmits the updated weighting coefficient information to the utilizing device to update the utilizing-side inference network.

11 Claims, 8 Drawing Sheets

(58) Field of Classification Search
CPC .... G06V 40/103; G06V 40/172; G06N 3/045; G06N 3/08; G06N 3/084; G06N 20/00; G06N 3/04; G06N 20/20; G06N 3/0464; G06N 3/082; G06N 20/10; G06N 3/047; G06N 3/088; G06N 3/096; G06N 7/01; G06N 5/04; G06T 2207/20084; G06T 2207/20081; G06T 2207/10016; G06T 2207/10024; G06T 2207/10081; G06T 3/4046; G06T 5/60; G06T 5/73; G06T 7/0012; G06T 7/11; G06T 7/40; G06F 18/2148; G06F 18/2413; G06F 18/214; G06F 18/217; G06F 18/2193
See application file for complete search history.

(56) References Cited

U.S. PATENT DOCUMENTS

| | | | | |
|---|---|---|---|---|
| 11,544,620 | B2* | 1/2023 | Lore | G06N 3/088 |
| 11,615,166 | B2* | 3/2023 | Rahnama-Moghaddam | G06N 3/045 |
| | | | | 382/224 |
| 11,640,530 | B2* | 5/2023 | Nitta | G06N 3/08 |
| | | | | 706/20 |
| 11,650,557 | B2* | 5/2023 | Fujii | G05B 13/02 |
| | | | | 702/183 |
| 11,676,025 | B2* | 6/2023 | Kolter | G06N 3/048 |
| | | | | 706/20 |
| 11,694,696 | B2* | 7/2023 | Kang | G10L 15/20 |
| | | | | 704/232 |
| 2003/0194124 | A1* | 10/2003 | Suzuki | G06T 7/0012 |
| | | | | 382/156 |
| 2015/0006444 | A1* | 1/2015 | Tamatsu | G06N 3/082 |
| | | | | 706/12 |
| 2016/0260014 | A1* | 9/2016 | Hagawa | G06F 18/24317 |
| 2017/0083796 | A1* | 3/2017 | Kim | G06V 10/454 |
| 2018/0018555 | A1* | 1/2018 | Wong | G06N 3/105 |
| 2018/0329892 | A1* | 11/2018 | Lubbers | G06N 3/08 |
| 2019/0057285 | A1 | 2/2019 | Hisada | |
| 2019/0228268 | A1* | 7/2019 | Zhang | G06V 10/82 |
| 2020/0125852 | A1* | 4/2020 | Carreira | G06N 3/049 |
| 2020/0234068 | A1* | 7/2020 | Zhang | G06F 18/2413 |
| 2020/0274894 | A1* | 8/2020 | Argoeti | H04L 63/1433 |
| 2020/0356840 | A1* | 11/2020 | Chabanne | G06N 3/042 |
| 2021/0004699 | A1* | 1/2021 | Okuno | G06N 20/20 |
| 2021/0012181 | A1* | 1/2021 | Zhu | G06N 3/08 |
| 2021/0027110 | A1 | 1/2021 | Takahashi et al. | |
| 2021/0127135 | A1* | 4/2021 | Lee | H04N 19/172 |
| 2021/0150330 | A1* | 5/2021 | Sharma | G06N 3/08 |
| 2021/0209468 | A1* | 7/2021 | Matsumoto | G06N 3/08 |
| 2021/0264314 | A1* | 8/2021 | Oura | G06N 5/04 |
| 2021/0319537 | A1* | 10/2021 | Hiasa | G06N 3/08 |
| 2021/0390686 | A1* | 12/2021 | Xu | G06T 7/40 |
| 2022/0028085 | A1* | 1/2022 | Vasilev | G16H 30/40 |
| 2022/0366538 | A1* | 11/2022 | Kim | G06T 7/11 |
| 2023/0087494 | A1* | 3/2023 | Vilsmeier | G06T 7/337 |
| 2023/0137031 | A1* | 5/2023 | Tsutsumi | G06V 10/54 |
| | | | | 382/108 |
| 2023/0274137 | A1* | 8/2023 | Makariou | G06N 3/096 |
| | | | | 706/25 |

FOREIGN PATENT DOCUMENTS

| | | |
|---|---|---|
| WO | 2017/145960 A1 | 8/2017 |
| WO | 2019/215868 A1 | 11/2019 |

OTHER PUBLICATIONS

Hinton et al., "Distilling the Knowledge in a Neural Network", arXiv:1503.02531v1, Available Online at: https://www.cs.toronto.edu/-hinton/absps/distillation.pdf, Mar. 9, 2015, pp. 1-9.

* cited by examiner

LEARNING UTILIZATION SYSTEM, UTILIZING DEVICE, LEARNING DEVICE, NON-TRANSITORY COMPUTER-READABLE MEDIUM, AND LEARNING UTILIZATION METHOD

CROSS-REFERENCE TO RELATED APPLICATION

The present application is based on PCT filing PCT/JP2020/028859, filed Jul. 28, 2020, the entire contents of which are incorporated herein by reference.

TECHNICAL FIELD

The present disclosure relates to a learning utilization system, a utilizing device, a learning device, non-transitory computer-readable medium, and a learning utilization method.

BACKGROUND ART

In recent years, a Deep Neural Network (DNN) has remarkably improved the accuracy of image recognition technology, and this technology is expected to be applied to remote devices, such as surveillance cameras, to implement an advanced security system.

On the other hand, for the DNN, a large amount of learning data is required to achieve sufficient accuracy by using randomly collected data and the learning process is substantially time-consuming. In addition, in the DNN, there is a case in which an image recognition device which has been learned by using widely collected data does not work with an expected recognition accuracy in a particular installation environment.

As a measure to these problems, Patent Document 1 discloses a technique that makes a selection from the collected data on the basis of the confidence score for classification and relearns the neural network using only the learning data having a low confidence score to reduce the time required for the learning process and the required memory size, thereby improving the efficiency of the learning process.

PRIOR ART REFERENCE

Patent Reference

Patent Document1: International Publication No. 2017/145960

SUMMARY OF INVENTION

Problem to be Solved by the Invention

However, although the technique disclosed in Patent Document 1 can improve recognition accuracy by selecting learning data input to one image recognition device on the basis of the confidence score output by the image recognition device, it cannot use data the correct answer of which is unknown.

Therefore, an object of one or more aspects of the present disclosure is to improve recognition accuracy by using data the correct answer of which is unknown.

Means of Solving the Problem

A learning utilization system according to an aspect of the present disclosure is a learning utilization system including a utilizing device and a learning device. The utilizing device includes a data acquisition unit configured to acquire target data; a utilizing-side storage unit configured to store a utilizing-side inference network which is a neural network used for inference in the utilizing device; a utilizing-side inference unit configured to use the utilizing-side inference network to perform inference from the target data; a determination unit configured to determine whether or not degree of certainty of inference result inferred by the utilizing-side inference network is lower than a predetermined criterion; and a utilizing-side transmitting unit configured to transmit the target data to the learning device when the degree is lower than the predetermined criterion. The learning device includes: a learning-side receiving unit configured to receive the target data; a learning-side storage unit configured to store a learning network which is a neural network functioning as a teacher model of the utilizing-side inference network, and a learning-side inference network which is a neural network having the same network structure as the utilizing-side inference network; a learning-side inference unit configured to use the learning network to perform inference from the target data to generate learning data including the target data and inference result inferred by the learning network; a learning unit configured to relearn the learning-side inference network by using the learning data to update weighting coefficients of the learning-side inference network and generates updated weighting coefficient information indicating the updated weighting coefficients; and a learning-side transmitting unit configured to transmit the updated weighting coefficient information to the utilizing device. The utilizing device further includes: a utilizing-side receiving unit configured to receive the updated weighting coefficient information; and an application unit configured to apply the updated weighting coefficients indicated by the updated weighting coefficient information to the utilizing-side inference network.

A utilization device according to an aspect of the present disclosure includes: a data acquisition unit configured to acquire target data; a utilizing-side storage unit configured to store a utilizing-side inference network which is a neural network used for inference; a utilizing-side inference unit configured to use the utilizing-side inference network to perform inference from the target data; a determination unit configured to determine whether or not degree of certainty of inference result inferred by the utilizing-side inference network is lower than a predetermined criterion; a utilizing-side transmitting unit configured to transmit the target data to the learning device when the degree is lower than the predetermined criterion; a utilizing-side receiving unit configured to receive updated weighting coefficient information indicating updated weighting coefficients from the learning device, the updated weighting coefficients being generated by relearning learning-side inference network by using learning data to update weighting coefficients of the learning-side inference network, the learning-side inference network being a neural network having the same network structure as the utilizing-side inference network, the learning data being generated by performing inference by using a learning network which is a neural network functioning as a teacher model of the utilizing-side inference network, the learning data including the target data and inference result inferred by the learning network; and an application unit configured to apply the updated weighting coefficients indicated by the updated weighting coefficient information to the utilizing-side inference network.

A learning device according to an aspect of the present disclosure includes: a learning-side receiving unit configured to receive, from a utilizing device, target data that is a target of inference in the utilizing device; a learning-side storage unit configured to store a learning network functioning as a teacher model of a utilizing-side inference network which is a neural network used for inference in the utilizing device, and a learning-side inference network which is a neural network having the same network structure as the utilizing-side inference network; a learning-side inference unit configured to use the learning network to perform inference from the target data to generate learning data including the target data and inference result inferred by the learning network; a learning unit configured to relearn the learning-side inference network by using the learning data to update weighting coefficients of the learning-side inference network and generates updated weighting coefficient information indicating the updated weighting coefficients; and a learning-side transmitting unit configured to transmit the updated weighting coefficient information to the utilizing device.

A program according to an aspect of the present disclosure is a program that causes a computer to function as: a data acquisition unit configured to acquire target data; a utilizing-side storage unit configured to store a utilizing-side inference network which is a neural network used for inference; a utilizing-side inference unit configured to use the utilizing-side inference network to perform inference from the target data; a determination unit configured to determine whether or not degree of certainty of inference result inferred by the utilizing-side inference network is lower than a predetermined criterion; a utilizing-side transmitting unit configured to transmit the target data to the learning device when the degree is lower than the predetermined criterion; a utilizing-side receiving unit configured to receive updated weighting coefficient information indicating updated weighting coefficients from the learning device, the updated weighting coefficients being generated by relearning learning-side inference network by using learning data to update weighting coefficients of the learning-side inference network, the learning-side inference network being a neural network having the same network structure as the utilizing-side inference network, the learning data being generated by performing inference by using a learning network which is a neural network functioning as a teacher model of the utilizing-side inference network, the learning data including the target data and inference result inferred by the learning network; and an application unit configured to apply the updated weighting coefficients indicated by the updated weighting coefficient information to the utilizing-side inference network.

A program according to an aspect of the present disclosure is a program that causes a computer to function as: a learning-side receiving unit configured to receive, from a utilizing device, target data that is a target of inference in the utilizing device; a learning-side storage unit configured to store a learning network functioning as a teacher model of a utilizing-side inference network which is a neural network used for inference in the utilizing device, and a learning-side inference network which is a neural network having the same network structure as the utilizing-side inference network; a learning-side inference unit configured to use the learning network to perform inference from the target data to generate learning data including the target data and inference result inferred by the learning network; a learning unit configured to relearn the learning-side inference network by using the learning data to update weighting coefficients of the learning-side inference network and generates updated weighting coefficient information indicating the updated weighting coefficients; and a learning-side transmitting unit configured to transmit the updated weighting coefficient information to the utilizing device.

A learning utilization method according to an aspect of the present disclosure includes: acquiring target data; using utilizing-side inference network which is a neural network used for inference to perform inference from the target data; determining whether or not degree of certainty of inference result is lower than a predetermined criterion; when the degree is lower than the predetermined criterion, using a learning network which is a neural network functioning as a teacher model of the utilizing-side inference network to perform inference from the target data to generate learning data including the target data and inference result interred by the learning network; relearning a learning-side inference network which is a neural network having the same network structure as the utilizing-side inference network by using the learning data to update weighting coefficients of the learning-side inference network; and applying the updated weighting coefficients to the utilizing-side inference network.

Effects of the Invention

One or more aspects of the present disclosure can improve recognition accuracy by using data the correct answer of which is unknown.

MODE FOR CARRYING OUT THE INVENTION

Embodiment 1

Figure 1:
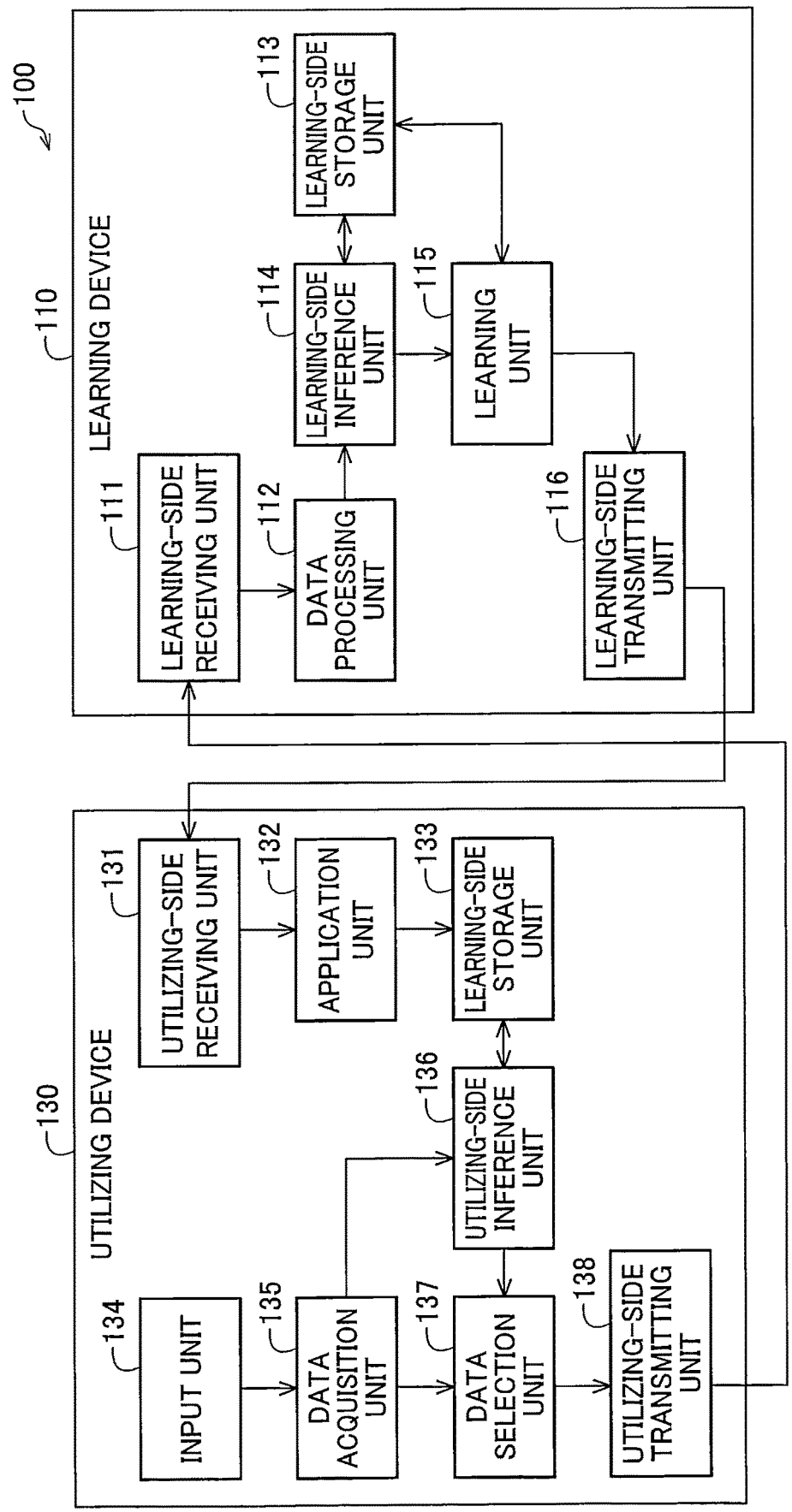
FIG. 1 is a block diagram schematically illustrating a configuration of a learning utilization system according to Embodiment 1.

FIG. 1 is a block diagram schematically illustrating a configuration of a learning utilization system 100 according to Embodiment 1.

In Embodiment 1, an example in which the learning utilization system 100 is used as an image recognition system for performing image recognition will be explained.

The learning utilization system 100 includes a learning device 110 and a utilizing device 130.

The learning device 110 is a central device which acquires data from the utilizing device 130 and performs learning of a second network by using a first network which is a teacher model.

In Embodiment 1, only one learning device 110 is installed in the learning utilization system 100 for simple explanation, but a plurality of learning devices 110 may be installed.

In general, the learning device 110 is a device that executes an application that is the installation purpose of the learning utilization system 100, manages and integrates inference results obtained from the utilizing device 130, and presents the inference results to the user. However, since such a function deviates from the scope of embodiment 1, the description thereof is omitted. Hereinafter, the application which is the installation purpose of the learning utilization system 100 will be referred to as a normal application.

The utilizing device 130 is a remote device installed at a site required for the purpose of installing the learning utilization system 100. In Embodiment 1, e.g., the utilizing device 130 is a device that performs image recognition at its installation site. As a specific example, the utilizing device 130 is an image recognition device, in other words, a monitoring camera incorporating an inference unit.

The utilizing device 130 transmits the inference result to the learning device 110 for execution of the normal application, and when the confidence score calculated from the inference result is within a predetermined range, transmits the original target data that is the target of inference to the learning device 110 together with inference result data indicating the inference result. The definition of confidence score will be described later.

In the following description, the utilizing device 130 is assumed to be an image recognition device, but the utilizing device 130 is not limited to such an example.

The learning device 110 includes a learning-side receiving unit 111, a data processing unit 112, a learning-side storage unit 113, a learning-side inference unit 114, a learning unit 115, and a learning-side transmitting unit 116.

The learning-side receiving unit 111 is a receiving unit that receives data transmitted from the utilizing device 130. The received data is supplied to the data processing unit 112.

When the image data as target data is included in the data supplied from the learning-side receiving unit 111, the data processing unit 112 supplies the received image data to the learning-side inference unit 114.

Further, the data processing unit 112 supplies the inference result data included in the data supplied from the learning-side receiving unit 111 to the normal application (not shown). The description of processes in the normal application is omitted.

The learning-side storage unit 113 is a storage unit for storing a first network which has been learned and a learning-side second network which has been learned. Here, the first network is also referred to as a learning network, and the learning-side second network is also referred to as a learning-side inference network.

The first network functions as a teacher model for the learning-side second network. The first network is a neural network that is designed to meet the specifications required by the normal application and is learned in advance by using known learning data. The first network is generally required to have a much higher generalization performance than the learning-side second network.

The learning-side second network is a student model with respect to the first network, and is a neural network in which at least the forms of the input layer and the output layer are equal to the first network. Normally, the number of intermediate layers other than the input layer and the output layer and the number of weighting coefficients in the learning-side second network are designed to be smaller than those in the first network which is a teacher model. However, such a design is not essential. Here, the learning-side second network is a neural network having the same network structure as the utilizing-side second network used in the utilizing device 130.

The learning-side inference unit 114 is an inference unit or a learning data generation unit that performs inference by using the first network which has been learned from image data supplied from the data processing unit 112 and generates learning data in which the inference result is associated with the original, image data. The learning data is a pair of inference-target image data and an inference result, and is used for learning for a learning-side second network. The inference result here may be not only the final output of the first network but also an intermediate output or may include an intermediate output.

The final output and the intermediate output of the first network and the learning-side second network differ depending on the content of the inference. In Embodiment 1, two cases are defined: one case is that the inference content is image classification and the other case is that the inference content is object detection. The range of the values indicated by the term "probability" used below is from 0% to 100%, but may be from 0 to 1.

When the inference performed by the first network and the learning-side second network is image classification, the output required by the normal application is one identification code indicating the class to which the subject of the image represented by the image data belongs.

On the other hand, in general, in the image classification problem, the neural network calculates the probability that an inference target image belongs to each class as a distribution for each of the known classes, and selects and outputs the identification code of the class having the highest probability among them.

Therefore, in the image classification problem, this identification code of the class having the maximum probability is defined as the final output, and the intermediate output is defined as the distribution of probabilities calculated for each class.

When the inference performed with the first network and the learning-side second network is object detection, the output required by the normal application is existing positions and existing ranges of objects in the inference target image, and the class of the objects.

In general, in an object detection problem, a neural network calculates a distribution of object existence probability in a target image and a distribution of classes to which a small region at each position in the target image belongs, and outputs a range of a region where the distribution of object existence probability exceeds a certain value and an object class in the range.

Therefore, in the object detection problem, the region information having an existence probability exceeding a certain value and the object class are defined as the final output, and the intermediate output is defined as the object existence probability distribution and the class distribution.

The learning unit 115 relearns the learning-side second network by using the learning data obtained from the learning-side inference unit 114 to update the weighting coefficients of the learning-side second network and generates updated weighting coefficient information indicating the updated weighting coefficients.

For example, the learning unit 115 uses the learning data obtained from the learning-side inference unit 114 to update the weighting coefficients of the learning-side second network so that the output of the learning-side second network for the image data included in the learning data matches with the inference result included in the learning data. Then, the learning unit 115 generates the updated weighting coefficient information indicating updated weighting coefficients which is the weighting coefficient after the updating. The generated updated weighting coefficient information is supplied to the learning-side transmitting unit 116.

The learning-side transmitting unit 116 is a transmitting unit that transmits the updated weighting coefficient information of the learning-side second network obtained from the learning unit 115 to the utilizing device 130.

Figure 2:
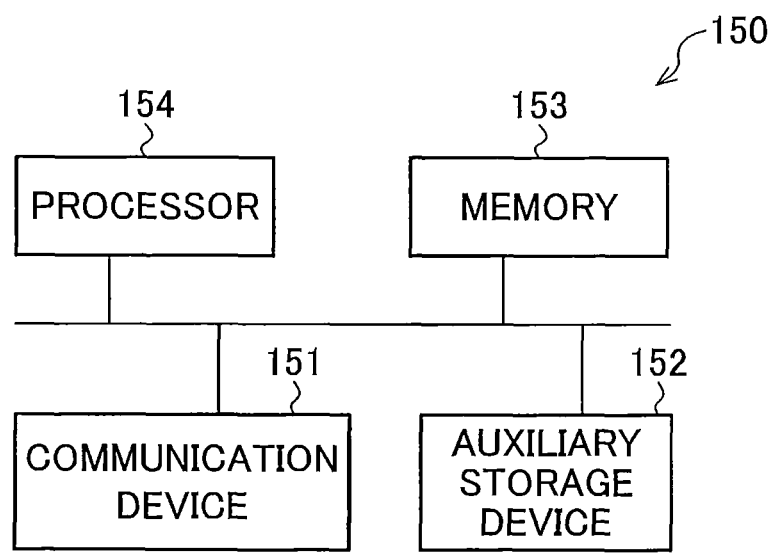
FIG. 2 is a block diagram schematically illustrating a configuration of a computer corresponding to a learning device.

The learning device 110 described above can be implemented by a computer 150 as shown in FIG. 2.

FIG. 2 is a block diagram schematically illustrating a configuration of the computer 150.

The computer 150 includes a communication device 151, an auxiliary storage device 152, a memory 153, and a processor 154.

The communication device 151 communicates with the utilizing device 130. For example, when the learning device 110 and the utilizing device 130 are connected to a network, the communication device 151 can be implemented by a Network Interface Card (NIC).

The auxiliary storage device 152 stores data and programs necessary for processes in the learning device 110. For example, the auxiliary storage device 152 can be implemented by a Hard Disc Drive (HDD) or Solid State Drive (SSD).

The memory 153 temporarily stores data or programs and provides a work area for the processor 154. The memory 153 can be implemented by a volatile memory or a nonvolatile memory.

The processor 154 loads the program stored in the auxiliary storage device 152 into the memory 153 and executes the program to execute the process in the learning device 110. The processor 154 can be implemented, e.g., by a Central Processing Unit (CPU).

For example, the learning-side receiving unit 111 and the learning-side transmitting unit 116 can be implemented by the communication device 151.

The learning-side storage unit 113 can be implemented by the auxiliary storage device 152.

The data processing unit 112, the learning-side inference unit 114, and the learning unit 115 can be implemented by the processor 154 loading a program stored in the auxiliary storage device 152 into the memory 153 and executing the program.

Referring back to FIG. 1, the utilizing device 130 includes a utilizing-side receiving unit 131, an application unit 132, a utilizing-side storage unit 133, an input unit 134, a data acquisition unit 135, a utilizing-side inference unit 136, a data selection unit 137, and a utilizing-side transmitting unit 138.

The utilizing-side receiving unit 131 is a receiving unit that receives updated weighting coefficient information from the learning device 110. The received updated weighting coefficient information is supplied to the application unit 132.

The application unit 132 applies the updated weighting coefficients indicated by the received updated weighting coefficient information to the utilizing-side second network stored in the utilizing-side storage unit 133. The utilizing-side second network is also referred to as a utilizing-side inference network.

The utilizing-side storage unit 133 is a storage unit for storing a utilizing-side second network which is a neural network used for inference in the utilizing device 130.

The utilizing-side second network has the same network structure as the learning-side second network. The updated weighting coefficients obtained by the learning of the learning-side second network is applied to the utilizing-side second network by the application unit 132.

The input unit 134 receives an input of target data that is a target of inference by the utilizing device 130. The input target data is supplied to the data acquisition unit 135. In Embodiment 1, the target data is assumed to be image data. Here, it is assumed that image data is input from a monitoring camera which is an image capturing device connected to the utilizing device 130, but Embodiment 1 is not Limited to such an example. For example, the utilizing device 130 may be implemented as a surveillance camera. In such a case, the input unit 134 functions as an image capturing unit including an image sensor such as a Charge Coupled Device (CCD) or Complementary Metal-Oxide-Semiconductor (CMOS).

The data acquisition unit 135 acquires target data through the input unit 134. The target data is the target of inference performed by the utilizing device 130. The target data is supplied to the utilizing-side inference unit 136 and the data selection unit 137.

The utilizing-side inference unit 136 is an inference unit that uses the utilizing-side second network stored in the utilizing-side storage unit 133 to perform an inference from the target data supplied from the data acquisition unit 135. Here, the utilizing-side inference unit 136 performs image recognition from image data which is target data. The inference result is supplied to the data selection unit 137.

The data selection unit 137 functions as a determination unit for determining whether or not degree of certainty of the inference result inferred by the utilizing-side second network is lower than a predetermined criterion.

For example, the data selection unit 137 associates the inference result of the utilizing-side inference unit 136 with the inference-target image data, calculates the confidence score with respect to the inference-target image data, and when the confidence score is within a predetermined range, supplies the inference result data indicating the inference result and the image data to the utilizing-side transmitting unit 138. Here, the confidence score indicates the certainty of the inference result inferred by the utilizing-side second network. The predetermined range is a range including the lowest value of the confidence score. Therefore, when the confidence score is within the predetermined range, the degree of certainty is lower than a predetermined criterion.

If the confidence score is not within the predetermined range, the data selection unit 137 supplies only the inference result data indicating the inference result to the utilizing-side transmitting unit 138.

Here, as mentioned above, the confidence score calculated by the data selection unit 137 is also defined in two cases, i.e., the case of image classification and the case of object detection.

Figure 3A:
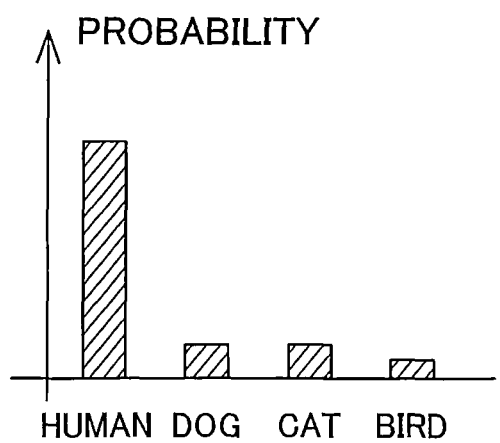
FIGS. 3A and 3B are graphs for explaining the confidence score of the inference result.

When the inference performed by the utilizing-side second network is image classification, the confidence score of the intermediate output of the utilizing-side second network can be said to be high qualitatively when the probability of a specific class is sufficiently high and the probability of other classes is low in the intermediate output as shown in FIG. 3A.

Figure 3B:
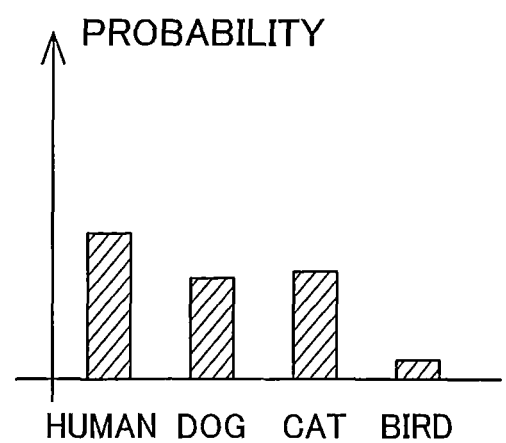

On the contrary, as shown in FIG. 3B, when the probability in the class having the maximum probability is low and the difference in probability between classes is small, the confidence score of the intermediate output of the utilizing-side second network can be said to be low.

In other words, it can be said that the confidence score of the output of the neural network is high when the bias to a specific class is large in the intermediate output, and that the confidence score is low when the bias is small.

Therefore, e.g., the maximum value of the probability distribution may be defined as the confidence score, and the predetermined range of the confidence score can be determined as 0% or more and N times the value obtained by dividing 100% by the number of classes or less. The value of N can be arbitrarily determined by the user or experimentally determined in the installation environment of the system.

Alternatively, e.g., the difference between the highest probability and the second highest probability may be defined as the confidence score, and the predetermined range of confidence score may be determined as 0% or more and x % or less. The value of x can be arbitrarily determined by the user or experimentally determined in the installation environment of the system.

Further, e.g., the value of the statistical variance in the probability distribution, which is the intermediate output, i.e., the sum of the squared values of the differences between the probability in each class and the class probability average value, may be defined as the confidence score, and the predetermined range of the confidence score may be determined as 0% or more and y % or less. The value of y can be arbitrarily determined by the user or experimentally determined in the installation environment of the system.

In addition to the above, any measure of bias to a specific class in the intermediate output can be used as the confidence score.

Figure 4:
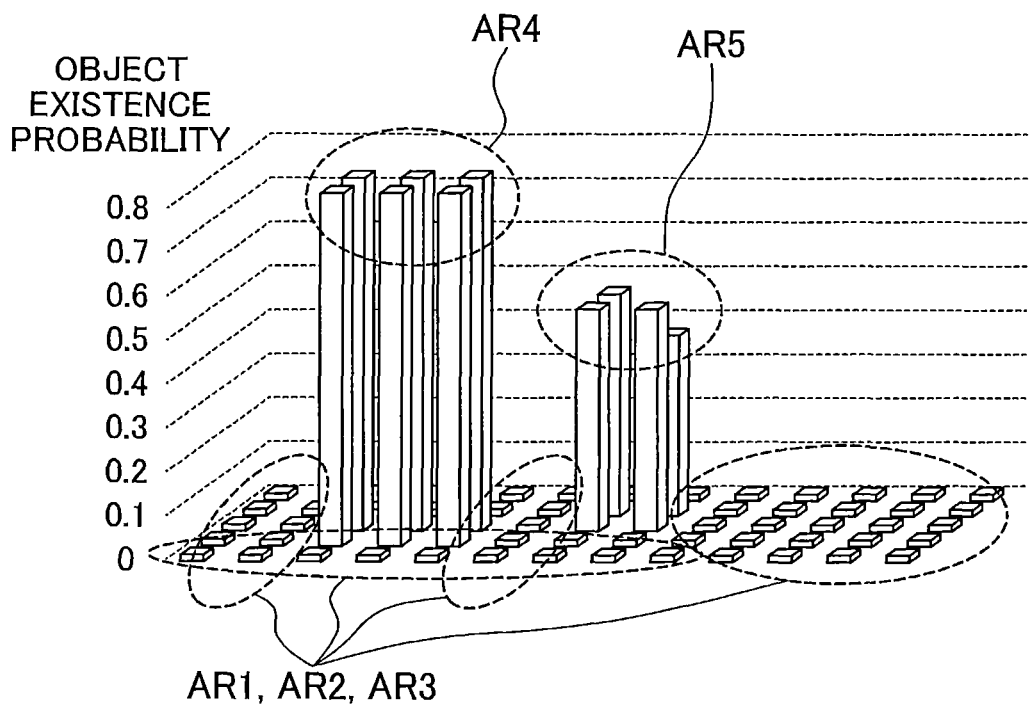
FIG. 4 is a graph illustrating an object existence probability distribution.

When the inference performed by the utilizing-side second network is object detection, the confidence score of the result output by the utilizing-side second network can be defined, e.g., on the basis of the value of the object existence probability distribution in the target image. As shown in FIG. 4, for the positions AR1, AR2, and AR3 where the existence probability is close to 0% in the object existence probability distribution, it can be determined that the confidence score indicating the case in which the object does not exist is high. On the contrary, for the position AR4 where the probability of existence is close to 100%, it can be determined that the confidence score indicating the case in which an object exists at that position is high. On the other hand, for the position AR5 where the probability of existence is about 50%, the confidence score indicating the case in which an object exists at the position and the confidence score indicating the case in which an object does not exist are half and half, in other words, it can be determined that the confidence score for an object is low.

Therefore, the minimum absolute value of the value obtained by subtracting 50% from the existence probability at each position of the object existence probability distribution can be defined as the confidence score of the inference result, and for example, the predetermined range of the confidence score can be determined as z % or less, in other words, the existence probability of (50−z) % or more and (50+z) % or less. The value of z can be determined arbitrarily by the user or experimentally in the installation environment of the system.

Referring back to FIG. 1, the utilizing-side transmitting unit 138 is a transmitting unit that transmits the data supplied by the data selection unit 137 to the learning device 110.

Figure 5:
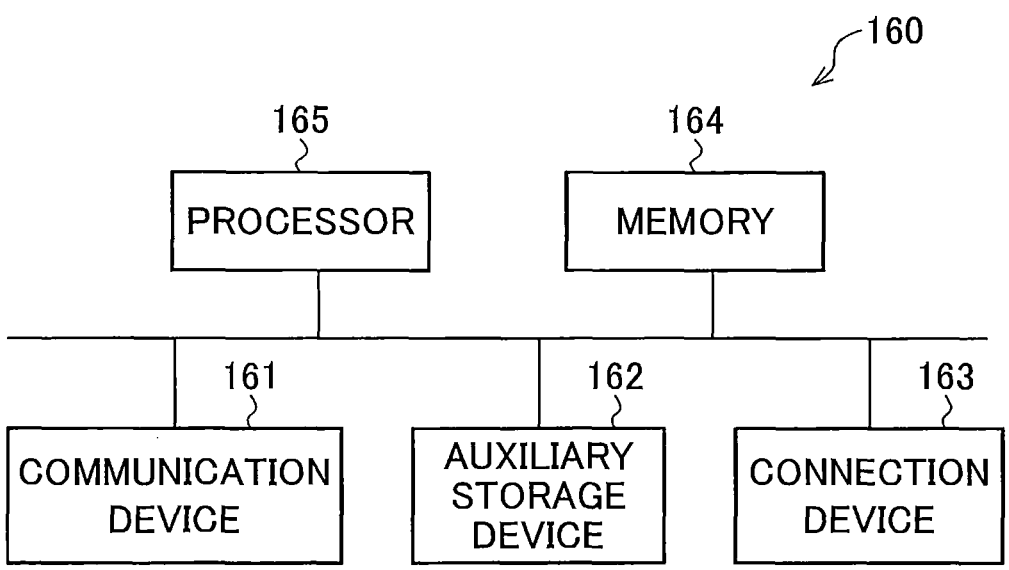
FIG. 5 is a block diagram schematically illustrating a configuration of a computer corresponding to a utilizing device.

The utilizing device 130 described above can be implemented by a computer 160 as shown in FIG. 5.

FIG. 5 is a block diagram schematically illustrating the configuration of the computer 160.

The computer 160 includes a communication device 161, an auxiliary storage device 162, a connection device 163, a memory 164, and a processor 165.

The communication device 161 communicates with the learning device 110. For example, when the learning device 110 and the utilizing device 130 are connected to a network, the communication device 161 can be implemented by an NIC.

The auxiliary storage device 162 stores data and programs necessary for processes in the utilizing device 130. For example, the auxiliary storage device 162 can be implemented by an HDD or an SSD.

The connection device 163 connects to an image capturing device such as a camera and transmits data to and receives data from the image capturing device. The connection device 163 can be implemented by a connection interface according to a Universal Serial Bus (USB).

The memory 164 temporarily stores data or programs and provides a work area for the processor 165. The memory 164 may be implemented by a volatile memory or a nonvolatile memory.

The processor 165 loads the program stored in the auxiliary storage device 162 into the memory 164 and executes the program to perform the process in the learning device 110. The processor 165 may be implemented, e.g., by a CPU.

For example, the input unit 134 can be implemented by the connection device 163.

The utilizing-side transmitting unit 138 can be implemented by the communication device 161.

The utilizing-side storage unit 133 can be implemented by the auxiliary storage device 162.

The application unit 132, the utilizing-side inference unit 136, the data acquisition unit 135, and the data selection unit 137 can be implemented by the processor 165 loading a program stored in the auxiliary storage device 162 into the memory 164 and executing the program.

Although FIG. 5 shows an example in which the utilizing device 130 is the computer 160, Embodiment 1 is not limited to such an example. For example, when the input unit 134 functions as an image capturing unit, the utilizing device 130 can be implemented by a camera instead of the computer 160. In this case, it is sufficient that the camera is provided with an image capturing device including an imaging element instead of the connection device 163 in the computer 160 shown in FIG. 5.

Next, the processing flow of the entire system will be described.

Before describing the basic processing flow, the initial process required in the system will be described with reference to FIG. 6.

Figure 6:
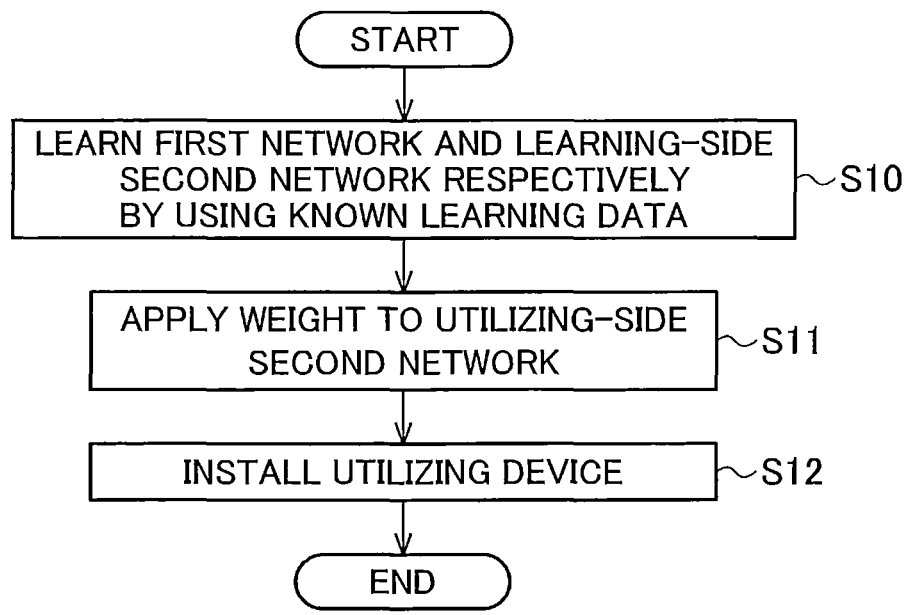
FIG. 6 is a flowchart indicating an initial process of the learning utilization system according to Embodiment 1.

FIG. 6 is a flowchart indicating an initial process of the learning utilization system 100 according to Embodiment 1.

First, in step 310, in the learning device 110, the learning-side storage unit. 113 stores a first network and a learning-side second network designed to satisfy the requirements of the normal application, and the learning-side inference unit 114 and the learning unit 115 learn the first network and the learning-side second network by using known learning data. Similarly, in the utilizing device 130, the utilizing-side storage unit 133 stores the utilizing-side second network designed to satisfy the requirements of the normal application.

The known learning data is a pair of image data and correct answer information generated so as to achieve a desired recognition result.

Although an example of learning in the learning device 110 is shown, learning may be performed by a learning device prepared separately.

Next, in step S11, the learning unit 115 generates updated weighting coefficient information indicating updated weighting coefficients which are the weighting coefficients after the updating in the learning-side second network, and transmits the updated weighting coefficient information to the utilizing device 130 via the learning-side transmitting unit 116. The application unit 132 of the utilizing device 130 acquires the updated weighting coefficient information through the utilizing-side receiving unit 131, and applies the updated weighting coefficients indicated by the received updated weighting coefficient information to the utilizing-side second network stored in the utilizing-side storage unit 133.

Although an example has been described in which the application unit 132 applies the updated weighting coefficients indicated by the updated weighting coefficient information to the utilizing-side second network, a functional unit (e.g., a setting unit) implemented by executing a separately prepared program may apply an updated weighting coefficients indicated by the updated weighting coefficient information to the utilizing-side second network.

Next, in step S12, the utilizing device 130 is installed at an installation position determined in accordance with a request to execute the normal application.

The above is the flow of the initial process.

Although the first network and the learning-side second network are independently learned by using known learning data in step S10, Embodiment 1 is not limited to such an example. For example, the first network may be first learned by using known learning data, and then the learning-side second network may be learned by using known knowledge distillation techniques.

Furthermore, although the utilizing devices 130 are installed at their respective installation positions after step S11 in FIG. 6, Embodiment 1 is not limited to such an example. For example, the updated weighting coefficients may be applied to the utilizing-side second network after the utilizing devices 130 are installed at their respective installation positions.

Figure 7:
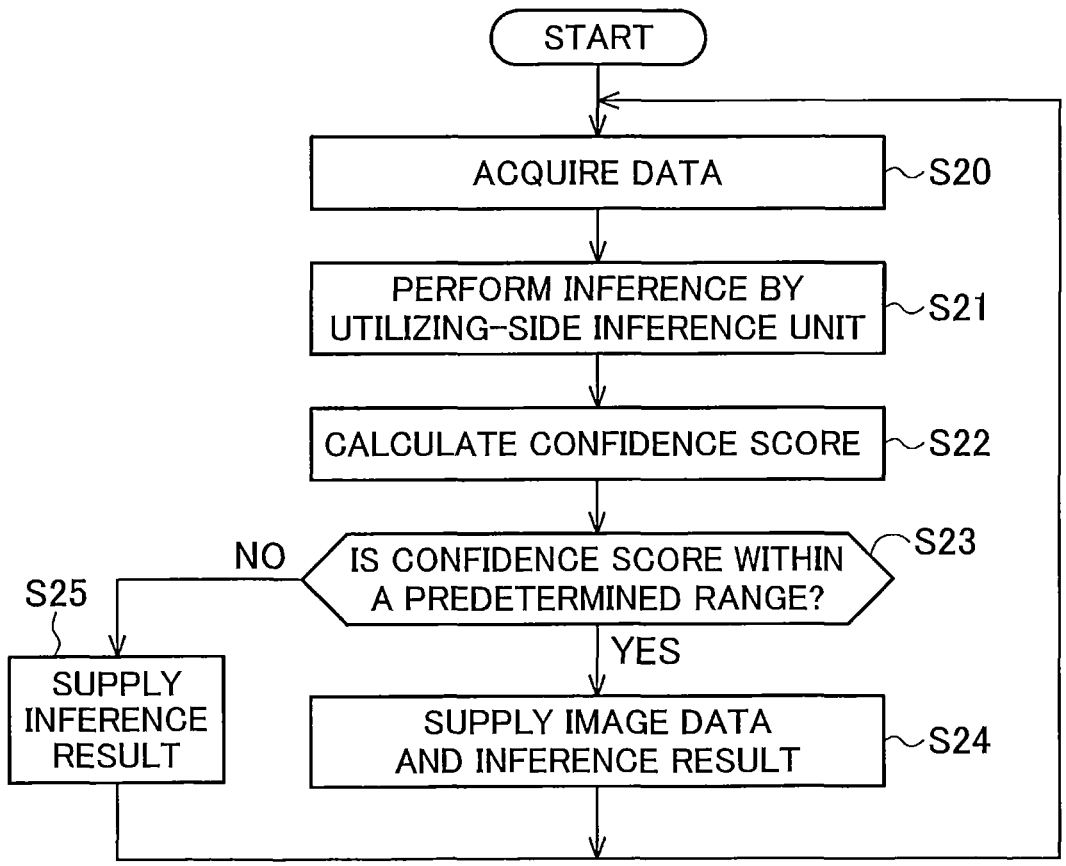
FIG. 7 is a flowchart indicating inference and data selection processes in a utilizing device according to Embodiment 1.

FIG. 7 is a flowchart indicating the inference and data selection processes in the utilizing device 130.

First, the data acquisition unit 135 acquires image data as an inference target via the input unit 134 (S20). Here, it is assumed that the data acquisition unit 135 acquires image data in a cycle. The cycle is determined according to the use of the normal application. The acquired image data is supplied to the utilizing-side Inference unit 136 and the data selection unit 137.

Next, the utilizing-side inference unit 136 performs inference on the acquired image data by using the utilizing-side second network (S21). After performing the inference, the utilizing-side inference unit 136 supplies the final output and the intermediate output of the inference result to the data selection unit 137.

Next, the data selection unit 137 calculates the confidence score from the intermediate output of the inference result (S22).

Then, the data selection unit 137 determines whether or not the calculated confidence score is within a predetermined range (S23). If the calculated confidence score is within the predetermined range (Yes in S23), the process proceeds to step S24, and if the calculated confidence score is not within the predetermined range (No in S23), the process proceeds to step S25.

In step S24, the data selection unit 137 sends the image data and the inference result data indicating the inference result to the learning device 110 via the utilizing-side transmitting unit 138.

If the confidence score is within the predetermined range, the confidence score is insufficient. Therefore, it can be regarded that the utilizing-side second network is not making sufficient determination on the image data in particular. Thus, the data selection unit 137 supplies the image data as an inference target to the learning device 110 so that the data can be used in additional learning. At this time, final output to be used in the normal application is also transmitted. After the transmission, the process returns to step S20, and the process waits until the data acquisition unit 135 acquires the next image data.

On the other hand, in step S25, the data selection unit 137 sends the inference result data indicating the inference result to the learning device 110 via the utilizing-side transmitting unit 138.

If the confidence score is not within the predetermined range, the confidence score is sufficient. Therefore, it can be regarded that the utilizing-side second network is making a sufficient determination on the image data. Thus, the data selection unit 137 supplies only the final output to the learning device 110.

Figure 8:
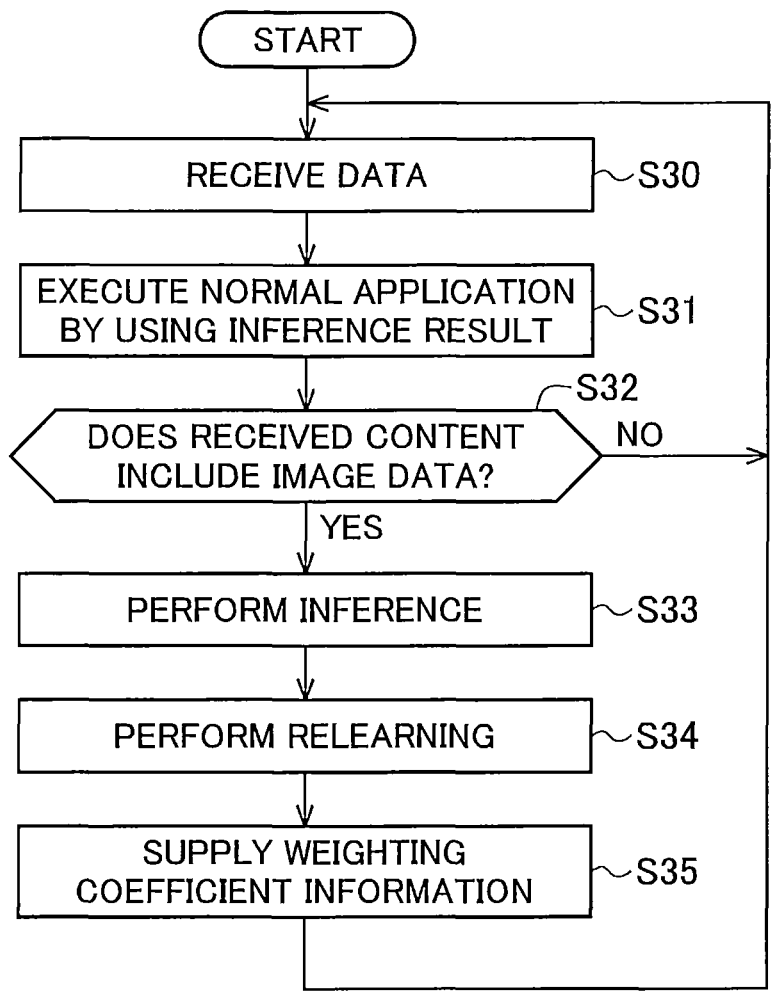
FIG. 8 is a flowchart indicating a relearning process of a second network in the learning device according to Embodiment 1.

FIG. 8 is a flowchart indicating a relearning process of the second network in the learning device 110.

First, the learning-side receiving unit 111 receives data from the utilizing device 130 (S30). The received data is supplied to the data processing unit 112.

Then, the data processing unit 112 supplies the inference result data included in the data supplied from the learning-side receiving unit 111 to the normal application, and the normal application executes processes by using the inference result data (S31).

Next, the data processing unit 112 determines whether or not the image data is included in the data supplied from the learning-side receiving unit 111 (S32). If image data is included (Yes in S32), the process proceeds to step 333, and if image data is not included (No in S32), the process returns to step S30.

In step S33, the data processing unit 112 supplies the image data included in the data supplied from the learning-side receiving unit 111 to the learning-side inference unit 114, and the learning-side inference unit 114 performs inference by using the first network stored in the learning-side storage unit 113 on the basis of this image data. The learning-side inference unit 114 supplies a pair of the inference result and image data to the learning unit 115 as learning data. The learning data here may be an intermediate output of the inference or may include an intermediate output of the inference.

Next, the learning unit 115 relearns the learning-side second network by using the learning data supplied from the learning-side inference unit 114 (S34). If the learning data includes an intermediate output, the learning unit 115 may update the weighting coefficients of the learning-side second network with the intermediate output as a target. This corresponds to learning by known knowledge distillation.

Next, the learning unit 115 extracts the updated weighting coefficients from the learning-side second network, generates updated weighting coefficient information indicating the extracted weighting coefficients, and sends the updated weighting coefficient information to the utilizing device 130 via the learning-side transmitting unit 116 (S35).

Thereafter, the process waits again until the learning-side receiving unit 111 receives data.

Although the processes from step 333 to step S35 in the flowchart shown in FIG. 8 are performed every time image data is received, Embodiment 1 is not limited to this example. For example, a data accumulation unit for accumulating the received image data may be provided, and the processes from step S33 to step 335 may be performed after a certain number or a certain amount of image data is accumulated. In this case, when the learning-side second network is relearned, the learning can be performed with the learning data collected as a batch, so that the learning process can be made more efficient.

Figure 9:
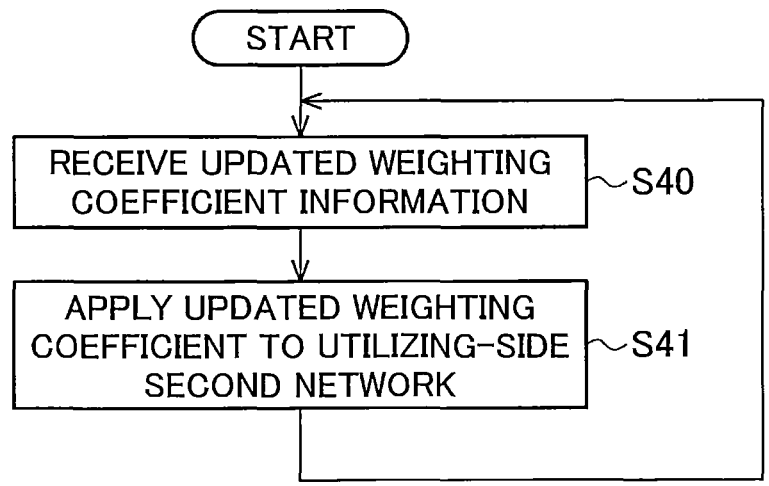
FIG. 9 is a flowchart indicating an applying process of updated weighting coefficients at the utilizing device side in Embodiment 1.

FIG. 9 is a flowchart indicating an applying process of the updated weighting coefficients in the side of the utilizing device 130.

The utilizing-side receiving unit 131 receives the updated weighting coefficient information from the learning device 110 (S40). The received updated weighting coefficient information is supplied to the application unit 132.

Next, the application unit 132 applies the updated weighting coefficients to the second network by replacing the weighting coefficient of the corresponding portion of the utilizing-side second network stored in the utilizing-side storage unit 133 with the updated weighting coefficient indicated by the updated weighting coefficient information supplied from the utilizing-side receiving unit 131 (S41).

After the application, the process waits until the utilizing-side receiving unit 131 receives the next updated weighting coefficient information.

The above is a flow for increasing accuracy of the utilizing device 130 in Embodiment 1.

The definition of the confidence score and the definition of the intermediate output described above are only examples.

Embodiment 2

Figure 10:
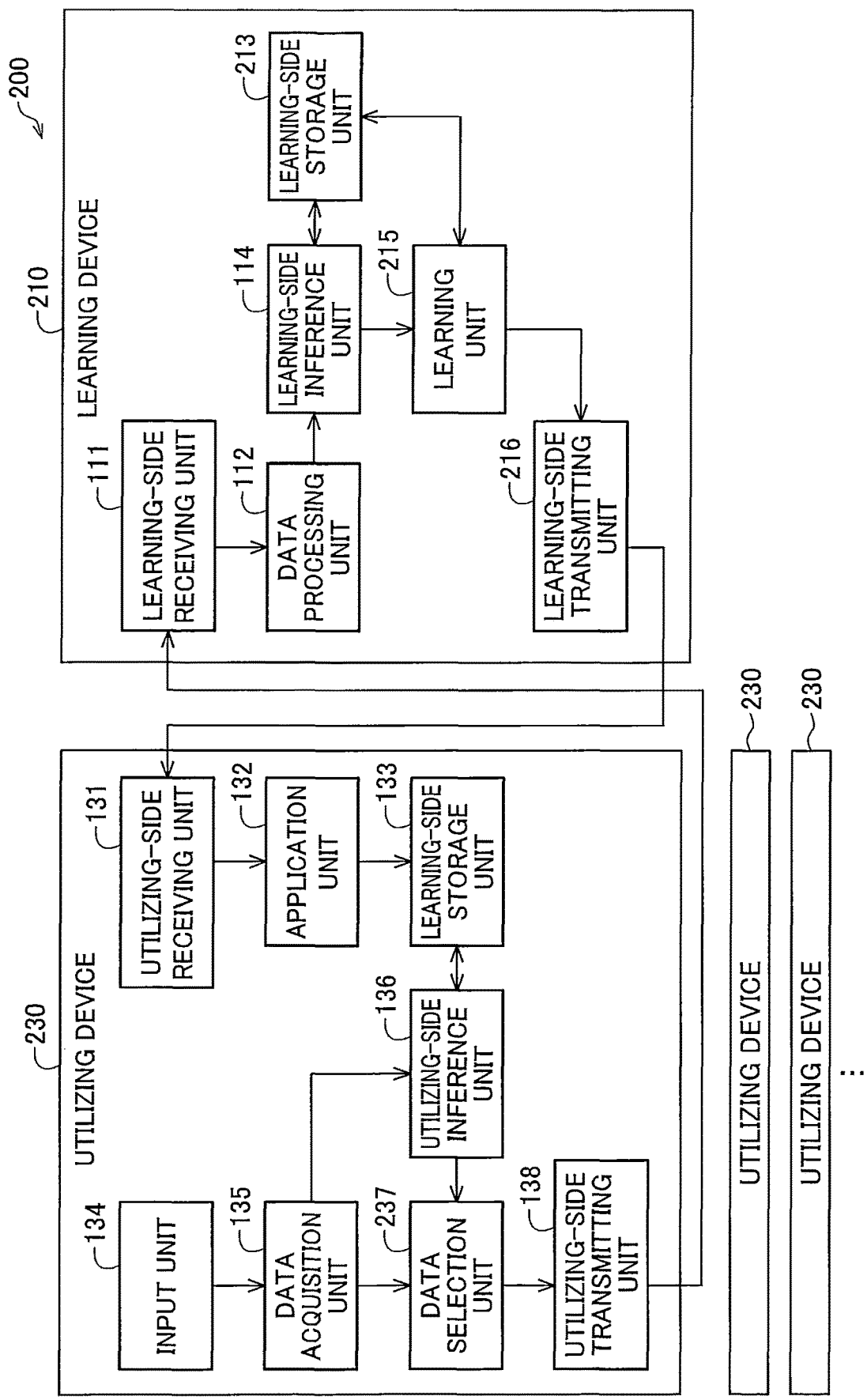
FIG. 10 is a block diagram schematically illustrating a configuration of a learning utilization system according to Embodiment 2.

FIG. 10 is a block diagram schematically illustrating a configuration of a learning utilization system 200 according to Embodiment 2.

In Embodiment 2, also, an example in which the learning utilization system 200 is used as an image recognition system for performing image recognition will be explained.

The learning utilization system 200 includes a learning device 210 and a plurality of utilizing devices 230.

In Embodiment 2, a configuration in which the plurality of utilizing devices 230 are provided for one learning device 210 will be described. In such a case, it is desirable that the learning device 210 manages the learning-side second network for each of the utilizing devices 230 and also manages the received data for each of the utilizing devices 230. It is assumed that the data sent from the utilizing device 230 to the learning device 210 includes an identification code, which is utilizing device identification information for identifying the utilizing device 230 that has generated the data. It is assumed that the plurality of utilizing devices 230 have the same configuration.

The learning device 210 includes a learning-side receiving unit 111, a data processing unit 112, a learning-side storage unit 213, a learning-side inference unit 114, a learning unit 215, and a learning-side transmitting unit 216.

The learning-side receiving unit 111, the data processing unit 112, and the learning-side inference unit 114 of the learning device 210 in Embodiment 2 are the same as the learning-side receiving unit 111, the data processing unit 112, and the learning-side inference unit 114 of the learning device 110 in Embodiment 1.

The learning-side storage unit 213 stores a first network which has been learned and a learning-side second network which has been learned. Here, the first network is also referred to as a learning network, and the learning-side second network is also referred to as a learning-side inference network.

In Embodiment 2, the learning-side storage unit 213 stores the learning-side second network for each utilizing device 230. For example, the learning-side second network is stored in association with the identification code of the utilizing device 230.

The learning unit 215 uses the learning data obtained from the learning-side inference unit 114 to update the weighting coefficients of the learning-side second network so that the output obtained by inputting the image data to the learning-side second network corresponding to the utilizing device 230 that is the transmission source of the image data included in the learning data matches with the inference result included in the learning data. Here, since the identification code of the transmission-source utilizing device 230 is included in the image data, the learning unit 215 uses the learning-side second network associated with the identification code. Then, the learning unit 215 generates updated weighting coefficient information indicating updated weighting coefficients which are the weighting coefficients after the updating.

The learning unit 215 supplies the generated updated weighting coefficient information to the learning-side transmitting unit 216 together with information indicating the transmission destination. The transmission destination is the utilizing device 230 that is the transmission source of the image data used for relearning the learning-side second network. For example, the learning unit 215 supplies the identification code of such a utilizing device 230 to the learning-side transmitting unit 216.

The learning-side transmitting unit 216 transmits the updated weighting coefficient information of the learning-side second network supplied from the learning unit 215 to the utilizing device 230 that is the transmission destination designated by the learning unit 215.

The utilizing device 230 includes a utilizing-side receiving unit 131, an application unit 132, a utilizing-side storage unit 133, an input unit 134, a data acquisition unit 135, a utilizing-side inference unit 136, a data selection unit 237, and a utilizing-side transmitting unit 138.

The utilizing-side receiving unit 131, the application unit 132, the utilizing-side storage unit 133, the input unit 134, the data acquisition unit 135, the utilizing-side inference unit 136, and the utilizing-side transmitting unit 138 of the utilizing device 230 in Embodiment 2 are the same as the utilizing-side receiving unit 131, the application unit 132, the utilizing-side storage unit 133, the input unit 134, the data acquisition unit 135, the utilizing-side inference unit 136, and the utilizing-side transmitting unit 138 of the utilizing device 130 in Embodiment 1.

The data selection unit 237 associates the inference result of the utilizing-side inference unit 136 with the inference-target Image data, calculates a confidence score with respect to the inference-target image data, and when the confidence score is within the predetermined range, supplies the inference result data indicating the inference result and the image data to the utilizing-side transmitting unit 138. Here, the predetermined range is the range including the lowest value of the confidence score.

If the confidence score is not within the predetermined range, the data selection unit 237 supplies only the inference result data indicating the inference result to the utilizing-side transmitting unit 138.

Here, the data selection unit 237 adds the identification code of the utilizing device 230 to the image data and the inference result data.

Next, the operation in Embodiment 2 will be described.

The initial process before starting the learning process is the same as that shown in FIG. 6. However, in this case, the same process is performed in each of the plurality of utilizing devices 230.

Figure 11:
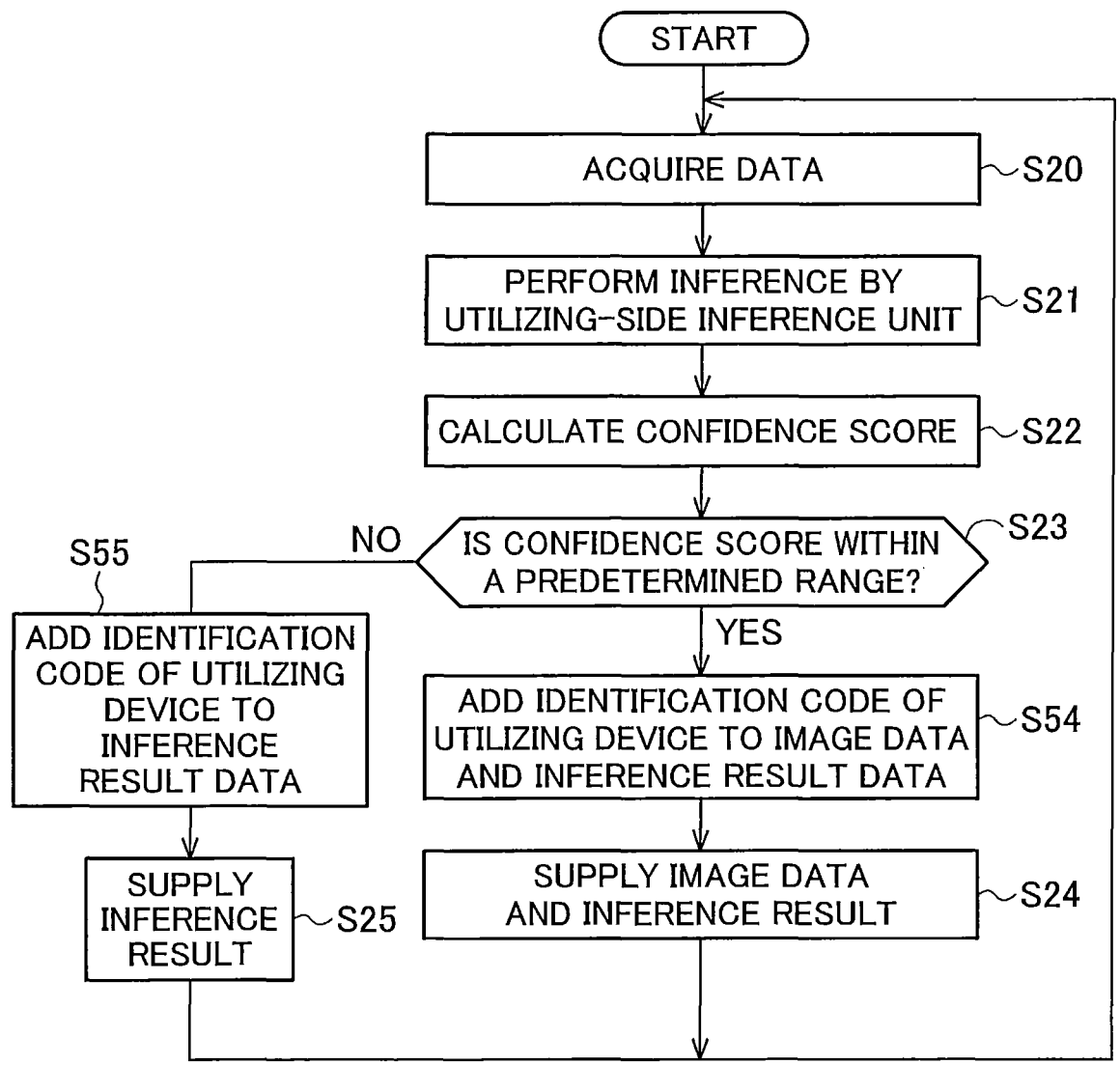
FIG. 11 is a flowchart indicating inference and data selection processes in a utilizing device according to Embodiment 2.

FIG. 11 is a flowchart indicating inference and data selection process in the utilizing device 230 in Embodiment 2.

The same reference numerals as those of the steps included in the flowchart shown in FIG. 7 are given to the steps included in the flowchart shown in FIG. 11 that perform the same process as the steps included in the flowchart shown in FIG. 7.

The processes of steps S20 to S23 in FIG. 11 is the same as the processes of steps S20 to S23 in FIG. 7.

However, in FIG. 11, if the confidence score calculated in step S23 is within the predetermined range (Yes in S23), the process proceeds to step S54, and if the confidence score calculated is not within the predetermined range (No in S23), the process proceeds to step S55.

In step S54, the data selection unit 237 adds the identification code of the utilizing device 230 to the image data and the inference result data indicating the inference result.

Then, the process proceeds to step S24, and the data selection unit 237 sends the image data and the inference result data to the learning device 210 via the utilizing-side transmitting unit 138.

On the other hand, in step S55, the data selection unit 237 adds the identification code of the utilizing device 230 to the inference result data indicating the inference result.

Then, the process proceeds to step S25, and the data selection unit 237 sends the inference result data to the learning device 210 via the utilizing-side transmitting unit 138.

Figure 12:
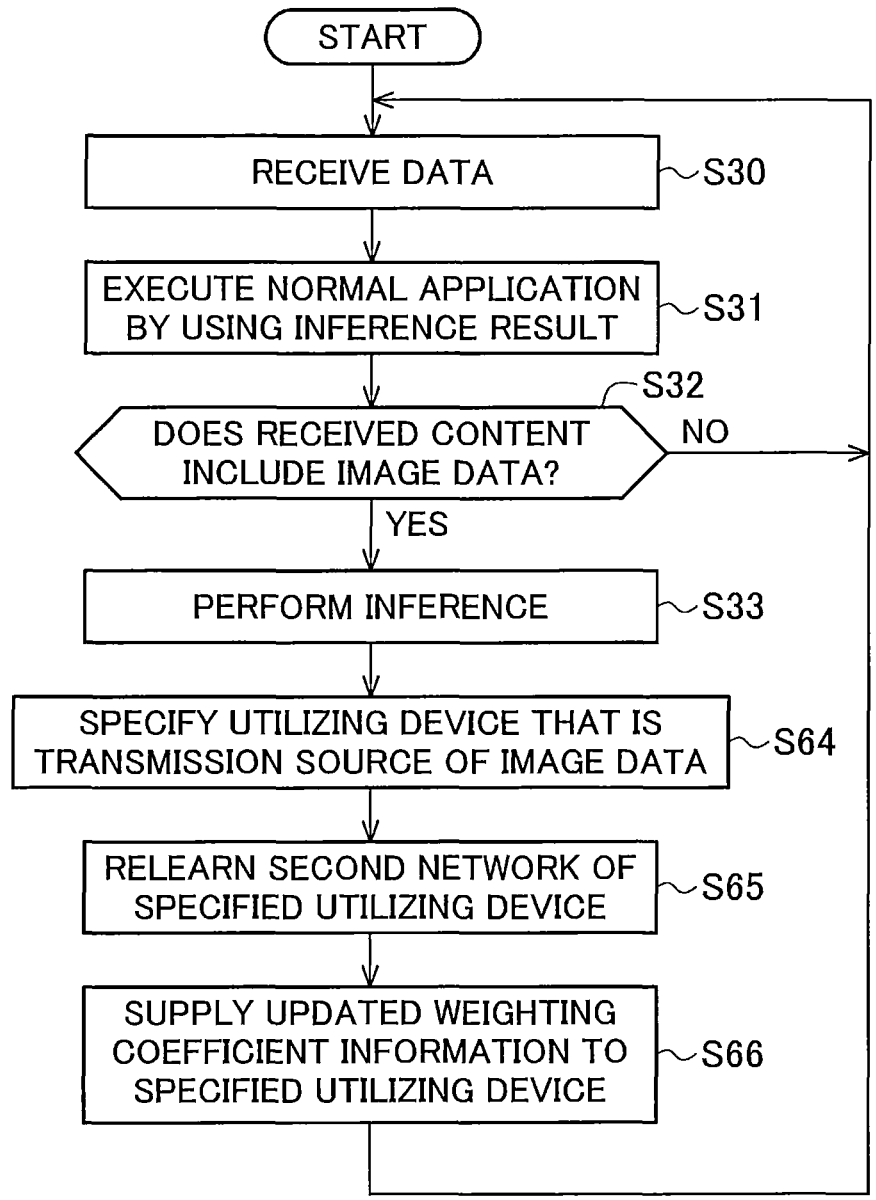
FIG. 12 is a flowchart indicating a relearning process of a second network in the learning device according to Embodiment 2.

FIG. 12 is a flowchart indicating the relearning process of the second network in the learning device 210 according to Embodiment 2.

The same reference numerals as those of the steps included in the flowchart shown in FIG. 8 are given to the steps included in the flowchart shown in FIG. 12 that perform the same process as the steps included in the flowchart shown in FIG. 8.

The processes of steps S30 to S33 in FIG. 12 are the same as the processes of steps S30 to S33 in FIG. 8.

However, in FIG. 12, after step S33, the process proceeds to step S64.

In step 364, the learning unit 215 specifies the identification code added to the image data included in the learning data supplied from the learning-side inference unit 114, thereby specifying the utilizing device 230 that is the transmission source of the image data.

Next, the learning unit 215 relearns the learning-side second network of the specified utilizing device 230 by using the learning data supplied from the learning-side inference unit 114 (365).

Next, the learning unit 215 extracts the updated weighting coefficients from the learning-side second network, generates updated weighting coefficient information indicating the extracted weighting coefficients, and sends the updated weighting coefficient information to the specified utilizing device 230 via the learning-side transmitting unit 116 (S66).

Thereafter, the process waits again until the learning-side receiving unit 111 receives data.

The above is a flow for improving the accuracy of the plurality of utilizing devices 230 in Embodiment 2.

As each utilizing device 230 learns data acquired at each installation site according to the configuration described in Embodiment 2, the utilizing-side inference unit 136 of each utilizing device 230 grows as an inference unit specialized for the installation site, so that the recognition rate of the utilizing device 230 becomes more accurate.

In Embodiment 1 and Embodiment 2, the target data is image data, and the utilizing-side second network, the first network, and the learning-side second network are described as a learned model for performing image recognition from the image data.

Specifically, the utilizing-side second network, the first network, and the learning-side second network are examples of a learned model for recognizing an image from image data and classifying the recognized image, or a learned model for recognizing an image from image data and detecting an object from the recognized image. However, Embodiment 1 and Embodiment 2 are not limited to these examples, and may be configured to perform other inferences.

DESCRIPTION OF REFERENCE CHARACTERS 100, 200 learning utilization system, 110, 210 learning device, 111 learning-side receiving unit, 112 data processing unit, 113, 213 learning-side storage unit, 114 learning-side inference unit, 115, 215 learning unit, 116, 216 learning-side transmitting unit, 130, 230 utilizing device, 131 utilizing-side receiving unit, 132 application unit, 133 utilizing-side storage unit, 134 input unit, 135 data acquisition unit, 136 utilizing-side inference unit, 137, 237 data selection unit, 138 utilizing-side transmitting unit

What is claimed is:

1. A learning utilization system comprising a utilizing device and a learning device, the utilizing device comprising:
a first processor to execute a first program; and
a first memory to store the first program which, when executed by the first processor, performs processes of,
determining whether or not degree of certainty of inference result inferred from target data by a utilizing-side inference network is lower than a predetermined criterion, the utilizing-side inference network being a neural network used for inference, the learning device comprising:
a second processor to execute a second program; and
a second memory to store the second program which, when executed by the second processor, performs processes of,
using a learning network to perform inference from the target data to generate learning data including the target data and inference result inferred by the learning network when the degree is lower than the predetermined criterion, the learning network being a neural network functioning as a teacher model of the utilizing-side inference network; and
relearning a learning-side inference network by using the learning data to update weighting coefficients of the learning-side inference network and generating updated weighting coefficient information indicating the updated weighting coefficients, the learning-side inference network being a neural network whose network structure is identical with network structure of the utilizing-side inference network, wherein
the first processor applies the updated weighting coefficients indicated by the updated weighting coefficient information to the utilizing-side inference network.

2. The learning utilization system according to claim 1, wherein the first processor calculates a confidence score indicating the degree, and determines that the degree is lower than the criterion when the confidence score is within a predetermined range.

3. The learning utilization system according to claim 1, wherein the number of intermediate layers and weighting coefficients of the learning network is larger than the number of intermediate layers and weighting coefficients of the utilizing-side inference network.

4. The learning utilization system according to claim 1, wherein the target data is image data, and the utilizing-side inference network, the learning network, and the learning-side inference network are models learned for performing image recognition from the image data.

5. The learning utilization system according to claim 1, wherein the target data is image data, and the utilizing-side inference network, the learning network, and the learning-side inference network are models learned for recognizing an image from the image data and classifying the recognized image.

6. The learning utilization system according to claim 1, wherein the target data is image data, and the utilizing-side inference network, the learning network, and the learning-side inference network are models learned for recognizing an image from the image data and detecting an object from the recognized image.

7. The learning utilization system according to claim 1, wherein
the learning utilization system comprises a plurality of the utilizing devices,
the learning device is configured to store a plurality of learning-side inference networks corresponding to each of the plurality of utilizing devices, and
when the learning device is configured to receive the target data from one utilizing device included in the plurality of utilizing devices, the second processor relearns the learning-side inference network corresponding to the one utilizing device included in the plurality of learning-side inference networks to generate the updated weighting coefficient information, and the learning device is configured to transmit the updated weighting coefficient information to the one utilizing device.

8. A utilizing device comprising:
a processor to execute a program; and
a memory to store the program which, when executed by the processor, performs processes of,
determining whether or not degree of certainty of inference result inferred from target data by using a utilizing-side inference network is lower than a predetermined criterion, the utilizing-side inference network being a neural network used for inference; and
applying updated weighting coefficients indicated by updated weighting coefficient information to the utilizing-side inference network when the degree is lower than the predetermined criterion, the updated weighting coefficients being generated by relearn learning-side inference network by using learning data to update weighting coefficients of the learning-side inference network, the learning-side inference network being a neural network whose network structure is identical with network structure of the utilizing-side inference network, the learning data being generated by performing inference by using a learning network which is a neural network functioning as a teacher model of the utilizing-side inference network, the learning data including the target data and inference result inferred by the learning network.

9. A learning device comprising:
a processor to execute a program; and
a memory to store the program which, when executed by the processor, performs processes of,
using a learning network to perform inference from target data to generate learning data including the target data and inference result inferred by the learning network, the learning network being a neural network functioning as a teacher model of a utilizing-side inference network which is a neural network used for inference; and
relearning a learning-side inference network by using the learning data to update weighting coefficients of the learning-side inference network and generating updated weighting coefficient information indicating the updated weighting coefficients, the learning-side inference network being a neural network whose network structure is identical with network structure of the utilizing-side inference network.

10. A non-transitory computer-readable medium that stores therein a program that causes a computer to execute processes of:
determining whether or not degree of certainty of inference result inferred from target data by using a utilizing-side inference network is lower than a predetermined criterion, the utilizing-side inference network being a neural network used for inference; and
applying updated weighting coefficients indicated by updated weighting coefficient information to the utilizing-side inference network when the degree is lower than the predetermined criterion, the updated weighting coefficients being generated by relearning learning-side inference network by using learning data to update weighting coefficients of the leaning-side inference network, the learning-side inference network being a neural network structure is identical with network structure of the utilizing-side inference network, the learning data being generated by performing inference by using a learning network which is a neural network functioning as a teacher model of the utilizing-side inference network, the learning data including the target data and inference result inferred by the learning network.

11. A non-transitory computer-readable medium that stores therein a program that causes a computer to execute processes of:

using a learning network to perform inference from target data to generate learning data including the target data and inference result inferred by the learning network, the learning network being a neural network functioning as a teacher model of a utilizing-side inference network which is a neural network used for inference; and relearning a learning-side inference network by using the learning data to update weighting coefficients of the learning-side inference network and generating updated weighting coefficient information indicating the updated weighting coefficients, the learning-side inference network being a neural network whose network structure is identical with network structure of the utilizing-side inference network.

* * * * *